(12) United States Patent
Ge et al.

(10) Patent No.: US 10,764,559 B2
(45) Date of Patent: Sep. 1, 2020

(54) DEPTH INFORMATION ACQUISITION METHOD AND DEVICE

(71) Applicant: Xi'an Jiaotong University, Xi'an (CN)

(72) Inventors: Chenyang Ge, Xi'an (CN); Huimin Yao, Xi'an (CN); Yanmei Xie, Xi'an (CN); Yanhui Zhou, Xi'an (CN)

(73) Assignee: XI'AN JIAOTONG UNIVERSITY, Xi'An (CN)

( * ) Notice: Subject to any disclaimer, the term of this patent is extended or adjusted under 35 U.S.C. 154(b) by 0 days.

(21) Appl. No.: 16/261,820

(22) Filed: Jan. 30, 2019

(65) Prior Publication Data
US 2020/0128225 A1  Apr. 23, 2020

(30) Foreign Application Priority Data
Oct. 23, 2018  (CN) .......................... 2018 1 1247537

(51) Int. Cl.
| | |
|---|---|
| *H04N 13/243* | (2018.01) |
| *G06T 7/80* | (2017.01) |
| *G06T 7/521* | (2017.01) |
| *G06T 7/593* | (2017.01) |
| *G06T 7/70* | (2017.01) |
| *H04N 13/271* | (2018.01) |
| *H04N 13/25* | (2018.01) |
| *H04N 13/122* | (2018.01) |

(Continued)

(52) U.S. Cl.
CPC ......... *H04N 13/243* (2018.05); *G06K 9/6215* (2013.01); *G06T 7/521* (2017.01); *G06T 7/593* (2017.01); *G06T 7/70* (2017.01); *G06T 7/80* (2017.01); *H04N 13/122* (2018.05); *H04N 13/25* (2018.05); *H04N 13/271* (2018.05); *G06T 2207/10012* (2013.01); *G06T 2207/10028* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 9,538,162 B2 * | 1/2017 | Choi | ...................... G01S 17/023 |
| 2015/0178936 A1 * | 6/2015 | Boisson | ............... H04N 13/271 |
| | | | 382/154 |

(Continued)

*Primary Examiner* — Chikaodili E Anyikire
(74) *Attorney, Agent, or Firm* — Dragon Sun Law Firm, PC; Jinggao Li, Esq.

(57) ABSTRACT

There are provided a depth information acquisition method and device. The method includes: determining a relative geometric position relationship between a ToF camera and left and right cameras in a binocular camera, and internal parameters; collecting the depth map generated by the ToF camera and the images of two cameras; converting the depth map into a binocular disparity value between corresponding pixels in the images of the two cameras; mapping, by using the converted binocular disparity value, any pixel in the depth map generated by the ToF camera to corresponding pixel coordinates of the images of the two cameras to obtain a sparse disparity map; and performing calculation on all pixels in the depth map generated by the ToF camera to obtain a dense disparity map, thereby obtaining more accurate and denser depth information; or inversely calibrating collected depth map by the ToF camera with the sparse disparity map.

17 Claims, 3 Drawing Sheets

(51) Int. Cl.
*G06K 9/62* (2006.01)
*H04N 13/00* (2018.01)

(56) References Cited

U.S. PATENT DOCUMENTS

2018/0108141 A1* 4/2018 Chen ..................... G06T 7/50
2019/0004178 A1* 1/2019 Motoyama ............. G01C 3/085

* cited by examiner

DEPTH INFORMATION ACQUISITION METHOD AND DEVICE

CROSS REFERENCE TO RELATED APPLICATION

This application is based upon and claims priority to Chinese Patent Application No. 2018112475372, filed on Oct. 23, 2018, the entire content of which is incorporated herein by reference.

TECHNICAL FIELD

The present disclosure relates to the technical fields of depth sensors, machine vision, image processing, binocular stereo vision and time of flight (TOF), and particularly relates to a depth information acquisition method and device.

BACKGROUND

In recent years, three-dimensional depth sensing devices have begun to catch people's eyes. High-precision three-dimensional depth sensing devices as a new medium for acquiring external information are conducive to the development of machine vision, enabling robots to understand the outside world, and also promoting the development of man-machine interaction. Depth sensing technology can be roughly divided into a passive type and an active type. The traditional binocular stereo vision ranging is a passive ranging method, which is greatly affected by ambient light and is complicated in the stereo matching process. Active ranging methods mainly include structured light coding and ToF (time of flight). A ToF camera acquires the depth information of the corresponding pixel by calculating the time of flight of the emitted laser. The acquired depth image has a lower resolution but a higher remote depth precision. When combined with binocular stereo vision, the ToF camera can obtain complementary advantages, so that the resolution of the depth image can be increased, the complexity of binocular stereo matching and depth calculation is reduced, and image information and depth information of each pixel can be acquired simultaneously.

Therefore, a heretofore unaddressed need exists in the art to address the aforementioned deficiencies and inadequacies.

SUMMARY

In view of this, the present disclosure provides a depth information acquisition method, including the following steps:

S100: determining a relative geometric position relationship between a pixel of a depth map generated by a ToF camera and pixels of images of left and right cameras in a binocular camera, and internal parameters of the ToF camera and the left and right cameras;

S200: collecting the depth map generated by the ToF camera and the images of the two cameras;

S300: converting the depth map into a binocular disparity value between corresponding pixels in the images of the two cameras;

S400: mapping, by using the converted binocular disparity value, any pixel in the depth map generated by the ToF camera to corresponding pixel coordinates of the images of the two cameras to obtain a sparse disparity map; and S500: step S400 on all pixels in the depth map generated by the ToF camera to obtain a dense disparity map, thereby obtaining more accurate and denser depth information; or inversely calibrating the depth map generated by the ToF camera collected in step S200 with the sparse disparity map, thereby outputting more accurate depth information.

The present disclosure further provides a depth information acquisition device, including: a ToF camera, left and right cameras in a binocular camera, and a processing unit, wherein the ToF camera obtains a depth map; and the two cameras obtain two images with disparity, and the processing unit is used to execute the depth information acquisition method according to claim 1.

Through the above technical solution, the sparse depth map of the ToF camera is converted and registered, and then mapped onto the images of the high-resolution left and right cameras to obtain a more accurate and denser depth map, and meanwhile, the images of the left and right cameras can also be utilized to calibrate the original depth map of the ToF camera. The method combines the advantages of ToF camera and binocular stereo ranging, and greatly improves the precision and resolution of depth ranging by multi-sensor fusion algorithm processing.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

DETAILED DESCRIPTION

The present invention will be further described in detail below with reference to FIG. 1 through FIG. 5.

Figure 1:
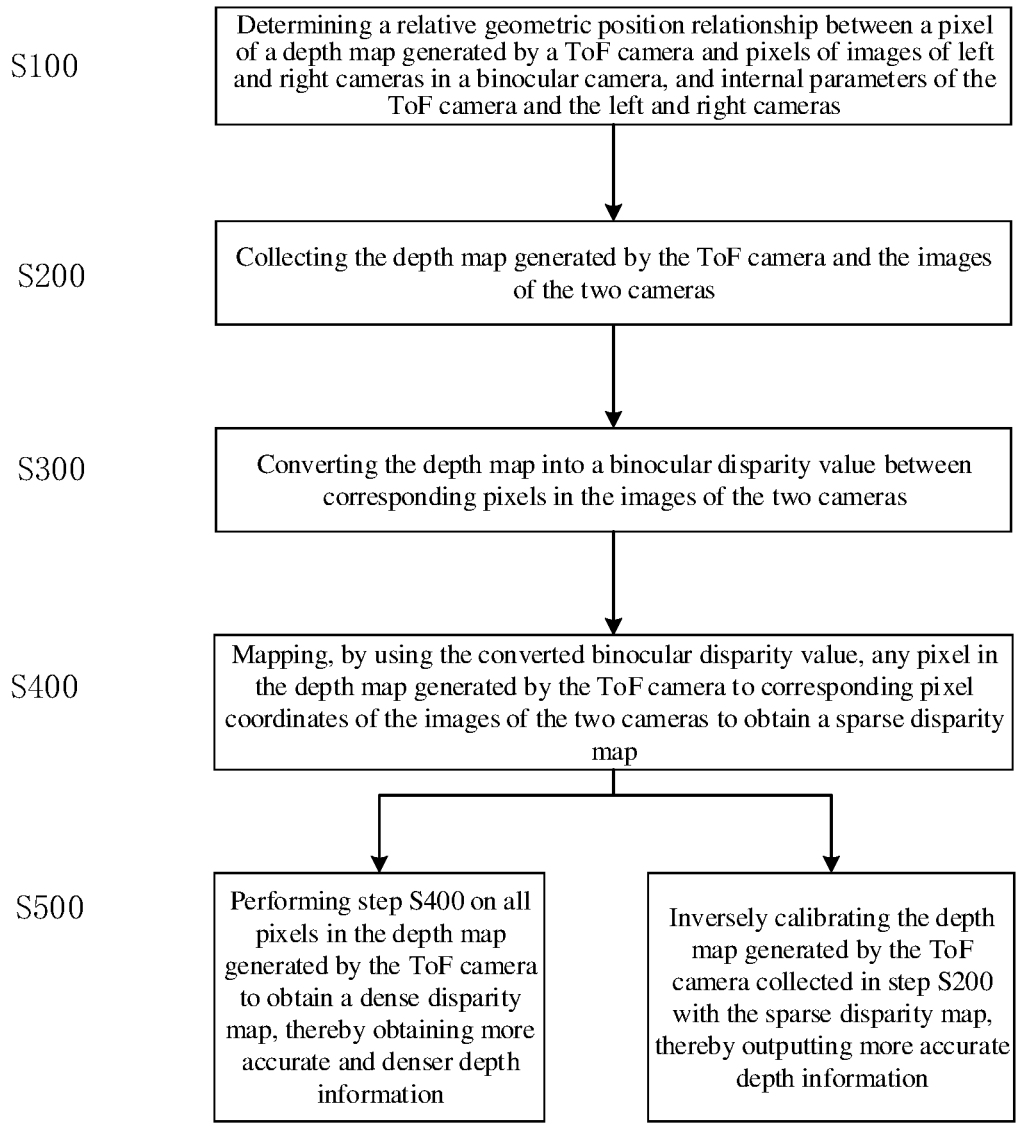
FIG. 1 is a schematic flowchart of a depth information acquisition method provided in one embodiment of the present disclosure.

In one embodiment, referring to FIG. 1, a depth information acquisition method is disclosed, including the following steps:

S100: determining a relative geometric position relationship between a pixel of a depth map generated by a ToF camera and pixels of images of left and right cameras in a binocular camera, and internal parameters of the ToF camera and the left and right cameras;

S200: collecting the depth map generated by the ToF camera and the images of the two cameras;

S300: converting the depth map into a binocular disparity value between corresponding pixels in the images of the two cameras;

S400: mapping, by using the converted binocular disparity value, any pixel in the depth map generated by the ToF camera to corresponding pixel coordinates of the images of the two cameras to obtain a sparse disparity map; and S500: performing step S400 on all pixels in the depth map generated by the ToF camera to obtain a dense disparity map, thereby obtaining more accurate and denser depth information; or inversely calibrating the depth map generated by the ToF camera collected in step S200 with the sparse disparity map, thereby outputting more accurate depth information.

Figure 2:
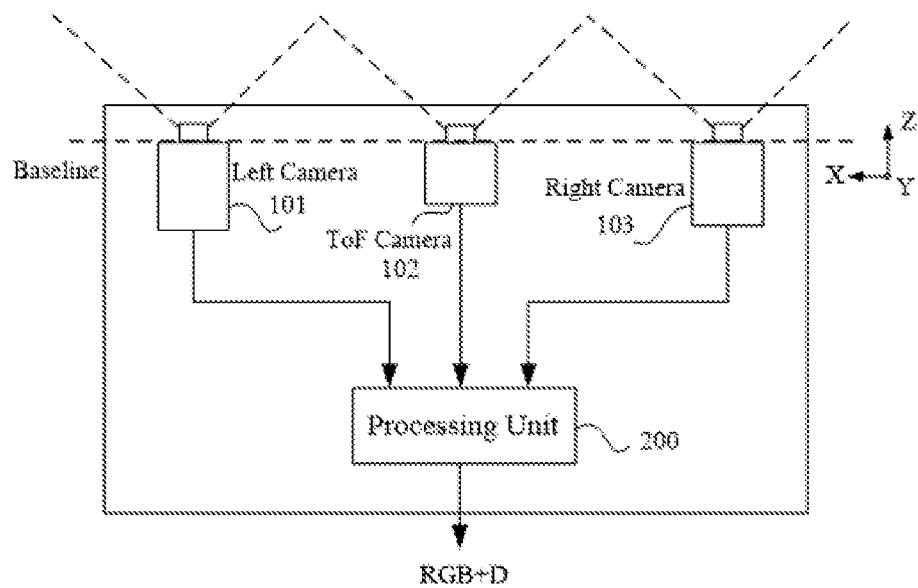
FIG. 2 is a structure diagram of a depth information acquisition device provided in one embodiment of the present disclosure.
Figure 3:
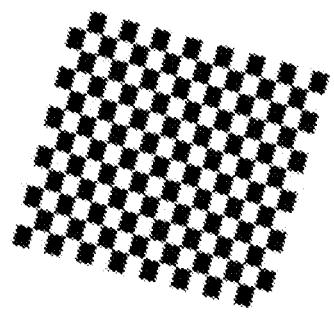
FIG. 3 is a schematic diagram of calibration of binocular and ToF cameras in one embodiment of the present disclosure.
Figure 3:
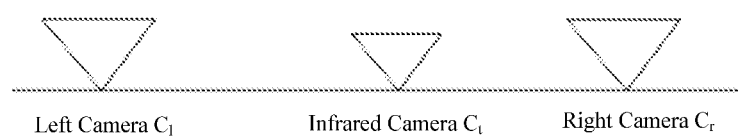

In another embodiment, referring to FIG. 2, the present disclosure further provides a depth information acquisition device, including: a ToF camera, left and right cameras in a binocular camera, and a processing unit, wherein the ToF camera obtains a depth map; and the two cameras obtain two images with disparity, and the processing unit is used to execute the depth information acquisition method according to claim 1;

wherein the ToF camera includes a transmitter, a receiving camera and a synchronization processing circuit. The distance is calculated by the time difference between transmission and reception, the sparse depth information can be obtained according to a certain frame rate and FoV, and the depth precision decreases as the distance increases; and wherein the two cameras are arranged horizontally or vertically to form binocular disparity. The two cameras may be the same model of color cameras, or a color camera and a black and white camera, or a high-resolution variable-focus color camera and a low-resolution color camera, or an OIS optical anti-shake color camera and a fixed-focus color camera.

In another embodiment, step S100 further includes the following sub-steps:

S1001: capturing checkerboard images from multiple angles by using the two cameras and the ToF camera; and S1002: solving internal parameters, external parameters and distortion coefficients of the two cameras, internal parameters, external parameters and distortion coefficients of the ToF camera, and the relative geometric position relationship between the two cameras and the ToF camera.

Figure 4:
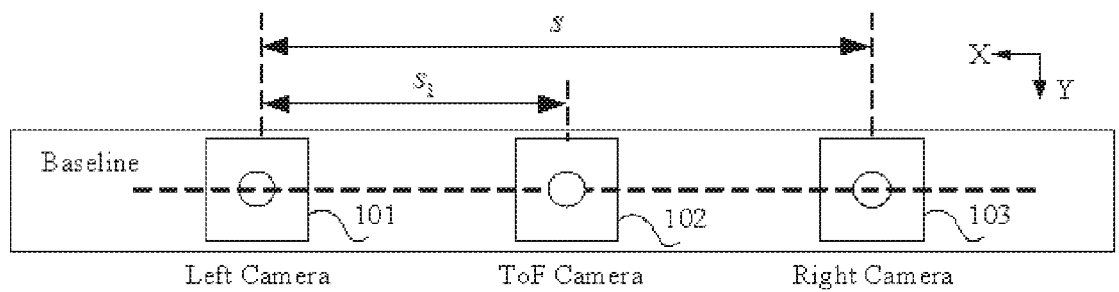
FIG. 4 is a schematic diagram showing the position relationship between left and right cameras and a ToF camera in one embodiment of the present disclosure.

Preferably, the binocular camera comprises two independent cameras with the same performance index (same optical lens and image sensor) arranged symmetrically in left and right and equidistantly on both sides of the ToF camera, and the optical axis thereof is parallel to and on the same baseline as the optical axis of the ToF camera, as shown in FIG. 4. Assume that the binocular camera has a focal length $f$, a dot pitch parameter of u and a baseline distance between the left and right cameras of s, and the ToF camera has an infrared camera focal length of $f_t$ and a dot pitch parameter of $u_t$.

In practical applications, the baseline between the two cameras may be adjusted according to different needs, or two cameras with different focal lengths or models may be used to fulfill different functions; and the two cameras can be placed horizontally or vertically. The baseline distance $s_1$ between the ToF camera and the left camera can also be adjusted according to needs.

In practical applications, the positions of the ToF camera and the left and right cameras may not be on the same horizontal line or vertical line, and the relative position between the ToF camera and the left and right cameras may be set according to the structure requirements of a smart device.

In another embodiment, the ToF camera calculates the depth by measuring the phase difference between emitted light and reflected light, and step S300 further includes the following sub-steps:

S3001: representing the depth map generated by the ToF camera by a grayscale image, the depth value being linear with the distance: $d_t = \alpha G_t + \beta$, wherein $d_t$ is the depth value measured by the ToF camera, $G_t$ is the grayscale value, and $\alpha$ and $\beta$ are coefficients;

S3002: obtaining, by binocular vision, spatial distance information by calculating the disparity value between the left and right images, the depth calculation formula of the binocular vision being $$d = \frac{fs}{\mu \Delta x},$$

wherein $\mu$ is the physical dot pitch of the camera image sensor, $f$ is the focal length of the camera, and s is the baseline distance between the left and right cameras; and S3003: obtaining, according to $d=d_t$, the conversion formula $$\Delta x = \frac{fs}{\mu(\alpha G_t + \beta)}$$

from the grayscale value in the depth map to the binocular disparity $\Delta x$.

In another embodiment, step S400 further includes the following sub-step:

combining internal parameters of the camera obtained by calibrating with the relative geometric position relationship between the ToF camera and the left camera, converting coordinates $(u_0, v_0)$ of any pixel in the depth map generated by the ToF camera to the position coordinates $(u_l, v_l)$ of the corresponding pixel in the image of the left camera, and then the corresponding pixel $(u_r, v_r)$ in the image of the right camera being $u_r = u_l + \Delta x_0, v_r = v_l$, wherein $\Delta x_0$ is the disparity value between the corresponding pixels in the left and right images.

In another embodiment, step S500 further includes the following sub-steps: repeating step S400, searching the optimal matching block in the image of the right camera according to matching blocks by taking pixels around the pixel $(u_l, v_l)$ in the image of the left camera as the center, and combining the binocular depth calculation formula $$d = \frac{fs}{\mu \Delta x}$$

to obtain the depth value, thereby obtaining a dense depth map corresponding to the image of the left camera; and similarly, expanding with the pixel $(u_r, v_r)$ in the image of the right camera to obtain a dense depth map corresponding to the image of the right camera, wherein $\mu$ is the physical dot pitch of the camera image sensor, $f$ is the focal length of the camera, and s is the baseline distance between the left and right cameras.

After mapping in step S400, the ToF converted disparity data will be sparsely and evenly distributed on the image collected by the left camera. However, due to the intrinsic measurement error of the ToF camera, there is an error between the converted disparity data and the disparity of the binocular measurement, so the converted disparity value needs to be corrected. In addition, due to the occlusion problem in the vision, the converted disparity value on the occlusion boundary in the left and right images may have many erroneous mapping relationships, and these erroneous disparity mapping points need to be eliminated one by one.

Figure 5:
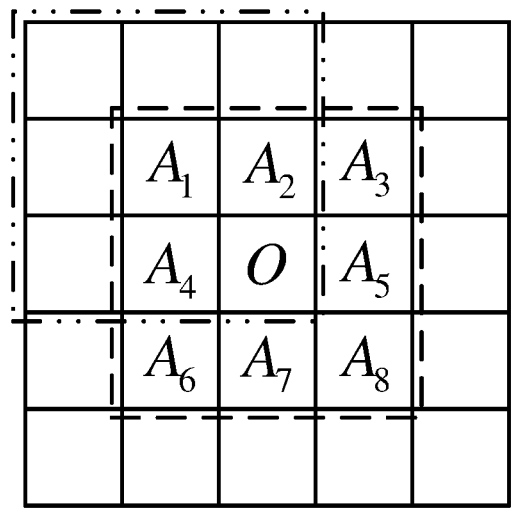
FIG. 5 is a schematic diagram of image block extraction in one embodiment of the present disclosure.

In another embodiment, a step of correcting the abovementioned mapped sparse disparity map is included between steps S400 and S500, wherein, the step of correcting the abovementioned mapped sparse disparity map includes the following substeps: taking the coordinate origin of the left camera as the viewpoint and the image collected by the right camera as a reference, an m×n image block $B_l$ is extracted in the image of the left camera with the pixel $(u_l, v_l)$ as the center, a neighborhood of a certain size is selected in the image of the right camera with $(u_r, v_r)$ as the center, and then an m×n image block $B_n$ is extracted with each pixel in the neighborhood as the center; as shown in FIG. 5, O is the pixel $(u_r, v_r)$, each small square in the figure represents a pixel, that is, a part of the image pixels taking O as the center are shown in the figure, the eight neighborhoods taking O as the center are $A_1$ to $A_8$, the dashed box is a 3×3 image block extracted by taking the pixel O as the center, the dotted line box is a 3×3 image block extracted by taking the pixel $A_l$ as the center, and in a similar fashion, nine image blocks may be extracted in the eight neighborhoods of the pixel O; and then, these image blocks $B_{ri}$, extracted from the image of the right camera are sequentially subjected to block matching calculation with the image block $B_l$ extracted from the image of the left camera, the similarity measure between the blocks is performed, then the image block with the highest similarity in the neighborhood is selected, if its corresponding similarity is greater than the threshold, the image block is regarded as the optimal matching block and the disparity point is corrected according to the corresponding position of the optimal matching block, or otherwise, the disparity point is eliminated as error mapping.

The resolution of the images of the left and right cameras of binocular vision is generally higher than that of the depth map of ToF, so after the data registration of the ToF depth map and the image of the binocular vision camera, only a sparse disparity map can be obtained, and it is required to perform calculation on the disparity of other pixels to obtain the dense disparity map.

The specific calculation method is as follows:

Method 1: The corrected disparity point obtained in the step of correcting the mapped sparse disparity map can be used as a seed pixel, and the disparity values of other pixels are continuously grown in the surrounding neighborhoods with the seed as the center. The growth method is as follows: taking a certain pixel in the neighborhood of the seed pixel as the center and the disparity of the seed pixel as a reference, the step of correcting the mapped sparse disparity map is repeated, an image block is extracted in the left image by taking a certain pixel in the neighborhood as the center, a search window is extracted by taking the corresponding pixel of the seed pixel in the right image as the center, and the disparity of a certain pixel in the neighborhood of the seed pixel is calculated by block matching. The pixel subjected to disparity calculation becomes a seed pixel, and step S500 is repeated.

Method 2: Starting from the upper left corner of the sparse disparity map, the pixels are calculated one by one line by line from left to right and from top to bottom; if the pixel is a reference disparity point, skipping is performed; if the pixel is not the reference disparity point, the reference disparity point closest to the pixel is selected as a reference, and the disparity point of the pixel is calculated; similarly, in the image of the left camera, an image block is extracted by taking the pixel as the center, a search window is extracted by taking the corresponding point of the reference disparity point in the image of the right camera as the center, and the disparity of the pixel is calculated by block matching; and after the one-by-one pixel calculation is completed, the disparity value of the whole image can be obtained, thereby making its resolution reach the resolution of the left and right images.

Compared with method 1, there is no complicated iterative algorithm in this method. The data starts from the upper left corner of the image and is processed pixel by pixel until the lower right corner of the image. This method is a good assembly line implementation method.

In another embodiment, a step of correcting the abovementioned mapped sparse disparity map is included between steps S400 and S500. After the inverse correction of the corrected disparity point obtained in the step, the original depth map of the ToF can be subjected to calibration and precision improvement, wherein, the inverse conversion is the inverse process of the conversion formula in step S300, $$G'_t = \alpha^{-1}\left(\frac{fs}{\mu \Delta x'} - \beta\right),$$

wherein $\Delta x'$ is the calibrated disparity value, and $G'_t$ is the exact grayscale value obtained after the inverse conversion of the calibrated disparity. After the grayscale value is subjected to inverse mapping, the original ToF depth map is calibrated, wherein the inverse mapping is to re-map the original ToF depth map mapped to the left and right images to the ToF depth map.

In terms of the abovementioned embodiment, the method can output depth maps of two modes, one mode is a more accurate and denser depth map obtained by mapping the converted and registered sparse depth map of the ToF camera to the high-resolution images of the left and right cameras, and the other mode is a more accurate ToF depth map. The depth maps of different modes can be selectively output according to different application scenarios.

The method can be similarly applied to a multi-sensor fusion device of similar active and passive vision modes, and the application thereof is not limited to smart phones, robots, smart home appliances, unmanned vehicles and the like. The binocular camera of the method is not limited to the same specification, and also supports different specifications of cameras. Meanwhile, the structure placement of the ToF camera and the binocular camera is flexible, and is not limited to horizontal or vertical placement. The method of expanding a sparse depth map into a dense depth map is not limited to the neighborhood expansion method and the pixel-by-pixel scanning method shown in the examples, and other super-resolution processing methods such as interpolation, filtering, and similarity may also be adopted.

Although the embodiments of the present invention have been described above with reference to the drawings, the present invention is not limited to the specific embodiments and the application fields described above, and the specific embodiments described above are merely illustrative and instructive, and not restrictive. A person skilled in the art can make various forms under the teachings of the present invention and without departing from the scope of the invention as claimed, and these are all protected by the present invention.

What is claimed is:

1. A depth information acquisition method, including the following steps:

S100: determining a relative geometric position relationship between a pixel of a depth map generated by a ToF camera and pixels of images of left and right cameras in a binocular camera, and internal parameters of the ToF camera and the left and right cameras;

S200: collecting the depth map generated by the ToF camera and the images of the two cameras;

S300: converting the depth map into a binocular disparity value between corresponding pixels in the images of the two cameras;

S400: mapping, by using the converted binocular disparity value, any pixel in the depth map generated by the ToF camera to corresponding pixel coordinates of the images of the two cameras to obtain a sparse disparity map; and S500: performing step S400 on all pixels in the depth map generated by the ToF camera to obtain a dense disparity map, thereby obtaining more accurate and denser depth information; or inversely calibrating the depth map generated by the ToF camera collected in step S200 with the sparse disparity map, thereby outputting more accurate depth information, wherein step S300 further includes the following sub-steps:

S3001: representing the depth map generated by the ToF camera by a grayscale image, a depth value being linear with a distance: $d_t=\alpha G_t+\beta$, wherein $d_t$ is the depth value measured by the ToF camera, $G_t$ is a grayscale value, and $\alpha$ and $\beta$ are coefficients;

S3002: obtaining, by binocular vision, spatial distance information by calculating the disparity value between the left and right images, a depth calculation formula of the binocular vision being $$d = \frac{fs}{\mu \Delta x},$$

wherein $\mu$ is a physical dot pitch of the camera, f is a focal length of the camera, and s is a baseline distance between the left and right cameras; and S3003: obtaining, according to $d=d_t$, a conversion formula $$\Delta x = \frac{fs}{\mu(\alpha G_t + \beta)}$$

from the grayscale value in the depth map to the binocular disparity $\Delta x$.

2. The method according to claim 1, wherein step S100 further includes the following sub-steps:

S1001: capturing checkerboard images from multiple angles by using the two cameras and the ToF camera; and S1002: solving internal parameters of the two cameras, internal parameters of the ToF camera, and the relative geometric position relationship between the two cameras and the ToF camera.

3. The method according to claim 1, wherein the two cameras are two independent cameras with the same performance index arranged symmetrically in left and right and equidistantly on both sides of the ToF camera, and the optical axis thereof is parallel to and on the same baseline as the optical axis of the ToF camera; and/or a baseline between the two cameras is adjusted according to different needs; and/or a baseline distance between the ToF camera and the left camera is adjusted according to needs; and/or the two cameras are the same model of color cameras, or a color camera and a black and white camera; and/or the two cameras are a high-resolution variable-focus color camera and a low-resolution color camera; and/or the two cameras are a color camera with an optical anti-shake function and a fixed-focus color camera; and/or the two cameras are placed horizontally or vertically; and/or the ToF camera and the two cameras are not on the same horizontal line or vertical line and are placed according to structure requirements of a smart device.

4. The method according to claim 1, wherein step S400 further includes the following sub-step:

converting internal parameters of the camera obtained by calibrating coordinates $(u_0,v_0)$ of any pixel in the depth map generated by the ToF camera and the relative geometric position relationship between the ToF camera and the left camera to position coordinates $(u_l,v_l)$ of the corresponding pixel in the image of the left camera, and then the corresponding pixel $(u_r,v_r)$ in the image of the right camera being $u_r=u_l+\Delta x_0, v_r=v_l$, wherein $\Delta x_0$ is the disparity value between the corresponding pixels in the left and right images.

5. The method according to claim 1, wherein a step of correcting the abovementioned mapped sparse disparity map is included between steps S400 and S500.

6. The method according to claim 5, wherein the step of correcting the abovementioned mapped sparse disparity map includes the following sub-steps:

extracting an m×n image block $B_l$ by taking the pixel $(u_l,v_l)$ in the image of the left camera as the center, selecting a neighborhood of a certain size in the image of the right camera with $(u_r,v_r)$ as the center, then extracting an m×n image block $B_{ri}$ with each pixel in the neighborhood as the center, performing block matching calculation on these image blocks $B_{ri}$ extracted from the image of the right camera sequentially with the image block $B_l$ extracted from the image of the left camera, performing similarity measure between blocks, selecting the image block with the highest similarity in the neighborhood, if its corresponding similarity is greater than a threshold, regarding the image block as an optimal matching block and correcting a disparity point according to the corresponding position of the optimal matching block, or otherwise, eliminating the disparity point as error mapping.

7. The method according to claim 1, wherein step S500 further includes the following sub-steps:

repeating step S400, searching the optimal matching block in the image of the right camera according to matching blocks by taking pixels around the pixel $(u_l,v_l)$ in the image of the left camera as the center, and combining the binocular depth calculation formula to obtain the depth value, thereby obtaining a dense depth map corresponding to the image of the left camera; and similarly, expanding with the pixel $(u_r,v_r)$ in the image of the right camera to obtain a dense depth map corresponding to the image of the right camera.

8. The method according to claim 1, wherein the calculating the dense disparity map in step S500 includes the following sub-steps:

starting from the upper left corner of the sparse disparity map, calculating the pixels one by one line by line from left to right and from top to bottom; if the pixel is a reference disparity point, skipping; if the pixel is not the reference disparity point, selecting the reference disparity point closest to the pixel as a reference, and calculating the disparity point of the pixel; similarly, in the image of the left camera, extracting an image block by taking the pixel as the center, extracting a search window by taking the corresponding pixel of the reference disparity point in the image of the right camera as the center, and calculating the disparity of the pixel by block matching; and after the one-by-one pixel calculation is completed, obtaining the disparity value of the whole image.

9. A depth information acquisition device, including: a ToF camera, left and right cameras in a binocular camera, and a processing unit; wherein the ToF camera obtains a depth map; and the two cameras obtain two images with disparity, and the processing unit is used to execute the depth information acquisition method according to claim 1.

10. A depth information acquisition device, including: a ToF camera, left and right cameras in a binocular camera, and a processing unit; wherein the ToF camera obtains a depth map; and the two cameras obtain two images with disparity, and the processing unit is used to execute the depth information acquisition method according to claim 2.

11. A depth information acquisition device, including: a ToF camera, left and right cameras in a binocular camera, and a processing unit; wherein the ToF camera obtains a depth map; and the two cameras obtain two images with disparity, and the processing unit is used to execute the depth information acquisition method according to claim 3.

12. A depth information acquisition device, including: a ToF camera, left and right cameras in a binocular camera, and a processing unit; wherein the ToF camera obtains a depth map; and the two cameras obtain two images with disparity, and the processing unit is used to execute the depth information acquisition method according to claim 1.

13. A depth information acquisition device, including: a ToF camera, left and right cameras in a binocular camera, and a processing unit; wherein the ToF camera obtains a depth map; and the two cameras obtain two images with disparity, and the processing unit is used to execute the depth information acquisition method according to claim 4.

14. A depth information acquisition device, including: a ToF camera, left and right cameras in a binocular camera, and a processing unit; wherein the ToF camera obtains a depth map; and the two cameras obtain two images with disparity, and the processing unit is used to execute the depth information acquisition method according to claim 5.

15. A depth information acquisition device, including: a ToF camera, left and right cameras in a binocular camera, and a processing unit; wherein the ToF camera obtains a depth map; and the two cameras obtain two images with disparity, and the processing unit is used to execute the depth information acquisition method according to claim 6.

16. A depth information acquisition device, including: a ToF camera, left and right cameras in a binocular camera, and a processing unit; wherein the ToF camera obtains a depth map; and the two cameras obtain two images with disparity, and the processing unit is used to execute the depth information acquisition method according to claim 7.

17. A depth information acquisition device, including: a ToF camera, left and right cameras in a binocular camera, and a processing unit; wherein the ToF camera obtains a depth map; and the two cameras obtain two images with disparity, and the processing unit is used to execute the depth information acquisition method according to claim 8.

* * * * *